Feb. 24, 1942.  W. F. KELLEY  2,274,071
INTERCONNECTION SYSTEM
Filed Aug. 25, 1939  9 Sheets-Sheet 1

INVENTOR
WALTER F. KELLEY
BY *W. A. Sparks*
ATTORNEY

Feb. 24, 1942.　　W. F. KELLEY　　2,274,071
INTERCONNECTION SYSTEM
Filed Aug. 25, 1939　　9 Sheets-Sheet 4

INVENTOR
WALTER F. KELLEY
BY *H. A. Spark*
ATTORNEY

Feb. 24, 1942.  W. F. KELLEY  2,274,071
INTERCONNECTION SYSTEM
Filed Aug. 25, 1939  9 Sheets-Sheet 6

INVENTOR
WALTER F. KELLEY
BY H. A. Sparks
ATTORNEY

Feb. 24, 1942. W. F. KELLEY 2,274,071
INTERCONNECTION SYSTEM
Filed Aug. 25, 1939 9 Sheets-Sheet 7

FIG. 10

INVENTOR
WALTER F. KELLEY
BY
*W. G. Sparks*
ATTORNEY

Feb. 24, 1942.  W. F. KELLEY  2,274,071
INTERCONNECTION SYSTEM
Filed Aug. 25, 1939  9 Sheets-Sheet 8

INVENTOR
WALTER F. KELLEY
BY
ATTORNEY

Feb. 24, 1942.  W. F. KELLEY  2,274,071
INTERCONNECTION SYSTEM
Filed Aug. 25, 1939  9 Sheets-Sheet 9

INVENTOR
WALTER F. KELLEY

BY *W. A. Sparks*
ATTORNEY

Patented Feb. 24, 1942

2,274,071

UNITED STATES PATENT OFFICE 2,274,071

INTERCONNECTION SYSTEM

Walter F. Kelley, Whitestone, N. Y., assignor to Remington Rand, Inc., Buffalo, N. Y., a corporation of Delaware Application August 25, 1939, Serial No. 291,850

17 Claims. (Cl. 74—501)

This invention relates generally to mechanical interconnection systems, and particularly to mechanical interconnection systems in which sets of incoming flexible connections or Bowden wires are interconnected with sets of outgoing flexible connections through a terminal board.

The invention is shown in connection with a tabulator of the type disclosed in U. S. Patents 2,044,119, 2,151,406, 1,780,621, and 1,768,526, issued to W. W. Lasker on June 16, 1936, March 21, 1939, November 4, 1930, and June 24, 1930, respectively, to which patents reference may be had for information concerning details that it is not deemed necessary to describe herein.

As will be seen from the above mentioned patents, cards are fed seriatim from a magazine into a sensing chamber where perforations on said card are sensed. The sensing chamber contains pins which rise with said chamber and, finding perforations on said card, pass upwardly through said perforations and, by means of the translating device, set stops which control the tabulating machine.

It is well known in the tabulating machine art that it is often desirous to print columns of practically any arrangement, sequence or distance apart on the printed page practically without any regard to the arrangement, sequence or distance apart of data on the punched card. However, as the columns to be printed differ with practically every account, it is necessary that the interponent connection of the translating device be changed to conform with each new accounting problem. Such changes consume considerable time and accordingly the tabulator user is provided with a number of translators each for use in an individual accounting problem. This arrangement may also be inconvenient to the tabulator user, for, if an accounting problem is to be carried out and the user has no translator for use in that particular problem, the accounting operation must be delayed until the manufacturer supplies the user with the necessary translator.

From the above it will be evident that this practice is costly to both the manufacturer and the user.

Therefore, it is the principal object of this invention to eliminate the necessity of providing each punch card accounting machine user with a number of translators each of which is to meet a different accounting problem.

Another object of this invention is to employ a single universal translator in a punch card accounting machine regardless of the accounting problem to be carried out.

It is a further object of this invention to enable the translator connections between the sensing and recording mechanism to be readily adjusted or altered as changes occur in the type of problem to be carried out.

In carrying out the above objects the machine herein disclosed is provided with a universal flexible translator which, through means of cables, the operator may interconnect any column in the sensing means with any one sector in the recording means with only preliminary instructions.

The translator includes a terminal board provided with a plurality of groups of connection positions in each group of which terminates a set of incoming or outgoing flexible interponents, the incoming connections terminating in the upper zone of the board and the outgoing terminating in the lower zone of the board. The other ends of the incoming and outgoing flexible interponents are each operatively associated with the sensing and recording means respectively. Each set of interponents consists of six individual interponents representing one column of index positions on a 90-column card and one-half column of index positions on the 45-column card. There are 92 sets of connection positions in the upper zone of the terminal board, and 100 connection positions in the lower zone of the board.

Removably secured to the terminal board is a panel board also having 92 connection positions in the upper zone and 100 in the lower zone, each set of connection positions in the panel board being in register with each set of connection positions in the terminal board. A plurality of flexible cables, each comprising six flexible interponents, is adapted to be individually interposed between the incoming and outgoing flexible connections.

The principal feature of this invention is the provision of a plurality of multiple interponent cables for selectively interconnecting sets of incoming and outgoing flexible connections terminating in a terminal board.

Another feature of this invention is the provision of a terminal board secured to a frame which is removable from the tabulator, whereby the incoming flexible connections may be readily connected to the set pins, and the outgoing flexible connections connected to the stop pins.

Another feature is the provision of a panel board detachable from the terminal board to permit the proper cable connections to be readily made.

Another feature is the provision of means for locking the cable plugs in the plug receptacles of the panel board after they have been inserted in said receptacles.

Another feature of this invention is a cable having flexible interponents twisted an odd number of half turns about a central core to prevent said flexible interponents from being displaced variable distances when the plugs of said cable are inserted in their proper receptacles.

Other objects and features of the invention will be apparent from the following description when read in conjunction with the accompanying drawings, wherein Figs. 1, 2, and 3 form a composite view of a tabulator shown in right-hand cross sectional elevation, the section being taken substantially through the center of the machine;

Fig. 1A is a schematic view showing the arrangement of Figs. 1, 2, and 3 to form the above composite view;

Figures 1, 1A:
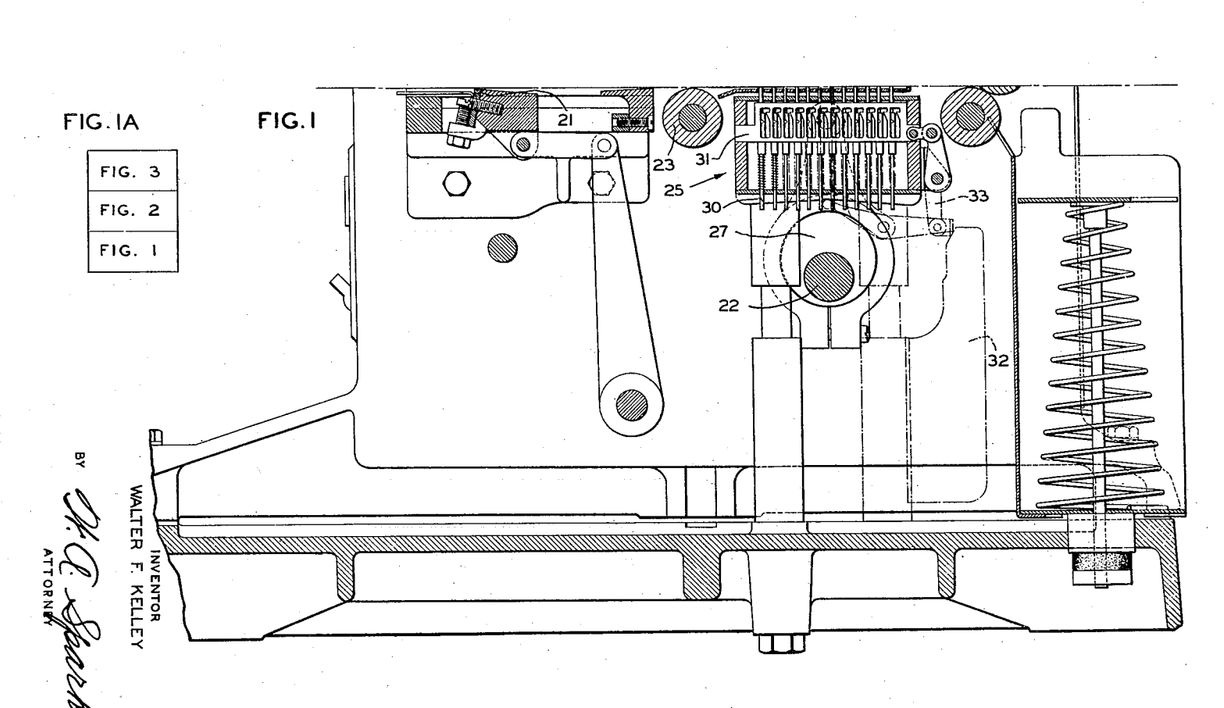
Figure 2:
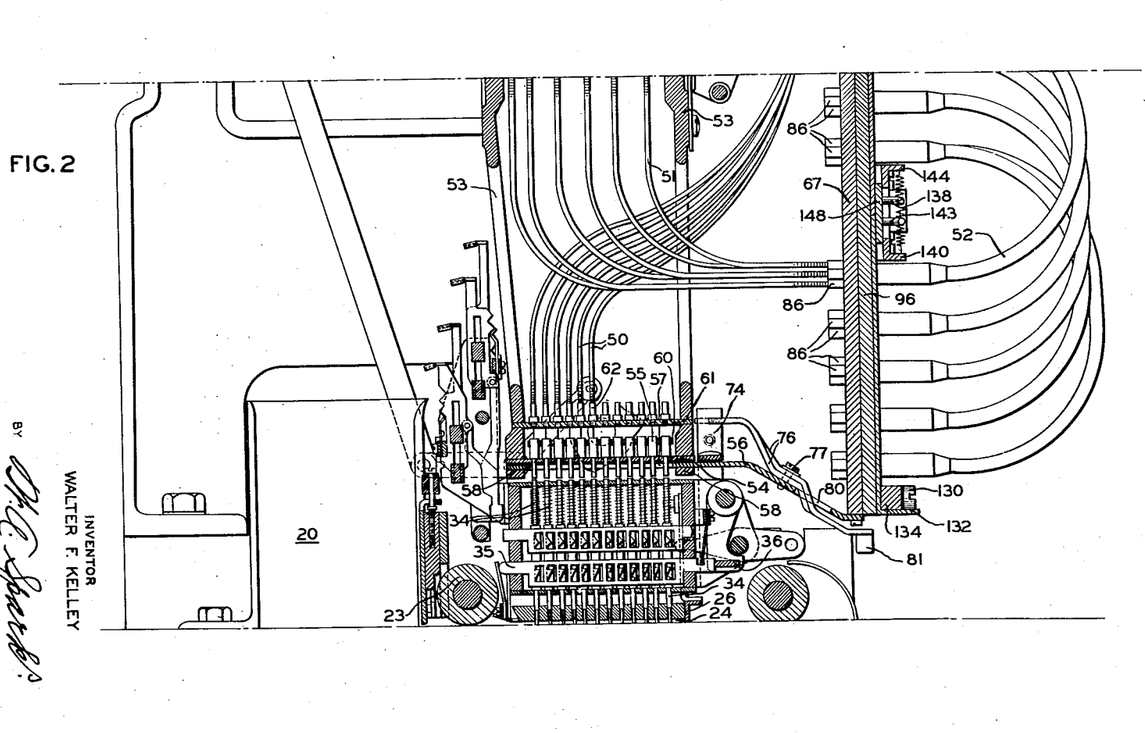
Figure 3:
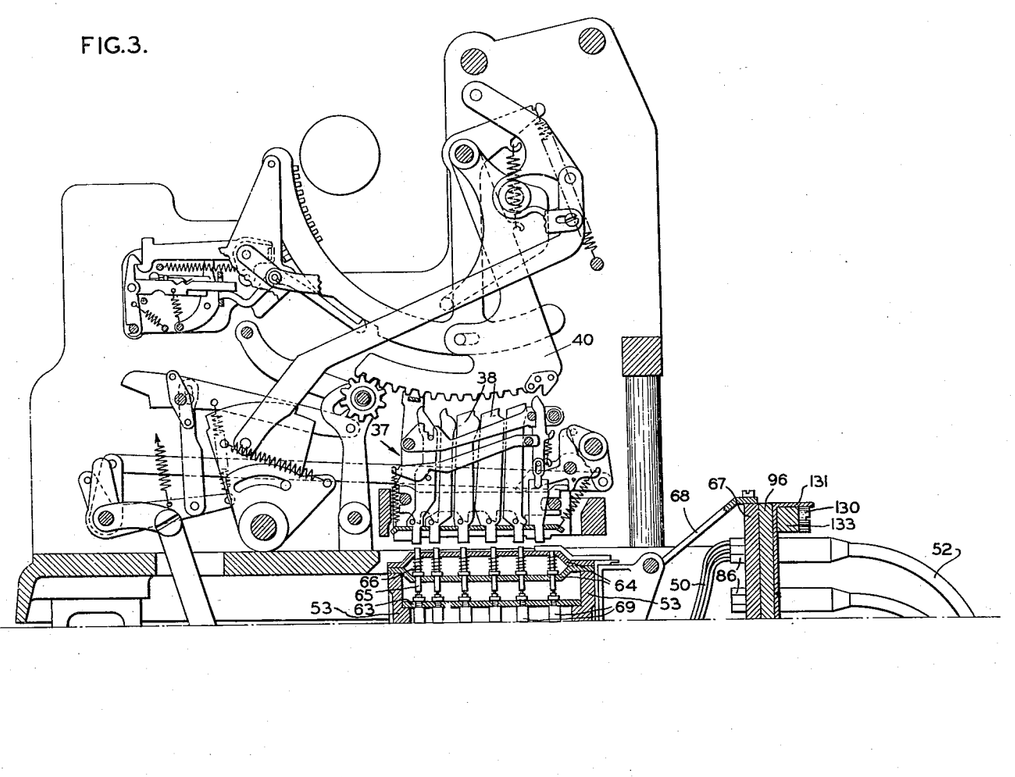

Referring to Figs. 1, 2, and 3, the tabulator consists of three sections, namely, the base section, the intermediate section, and the head section. The base section includes generally the card feeding mechanism, the sensing chamber wherein cards are analyzed, and the record retaining mechanism.

The intermediate section of the machine consists of a flexible translator which forms the subject matter of this invention. The head section consists generally of the accounting and printing mechanism.

Card feeding and sensing mechanism

The card feeding and sensing mechanisms shown in connection with the present invention are substantially the same as that disclosed in the above mentioned Patent 2,044,119, and only so much as would enable one skilled in the art to understand its operation will be described herein.

Referring to Figs. 1, 2 and 3, the cards are fed seriatim from a magazine 20 by a picker 21 which is under control of a cam (not shown) fixed to a main shaft 22. As each card emerges from the magazine 20 it is seized by rollers 23 and fed into a card chamber 24, above a sensing box generally designated as 25. Once in the chamber 24 the card is gripped by cooperating feed and skid rollers (not shown) and drawn further into the chamber until it is arrested by a stop 26. While in its arrested position the card is sensed by the pin box 25 which is reciprocated under control of a pair of eccentric discs 27 (one shown) mounted upon the main shaft 22. The sensing box contains a plurality of spring-pressed pins 30 mounted for vertical movement and which are arranged in rows of columns in the same manner as the index positions of the well known Powers punch card. A plurality of locking slides 31 is provided for positively raising the sensing pins that have entered perforations in a card while permitting the sensing pins that have not entered perforations to be depressed by the card. These locking slides operate under control of a stationary cam plate 32 and a lever 33.

Record retaining mechanism

The record retaining mechanism shown in connection with the present invention is the same as that disclosed in the above mentioned Patent 2,151,406 and the following is a brief description of its construction and operation.

This mechanism includes a plurality of set pins 34 (Fig. 2), each in vertical alignment with its associated sensing pin 30, and a plurality of locking slides 35 for locking the set pins in their effective raised positions after they have been actuated by the sensing pins 30. The set pins 34 are held in their depressed position by individual springs which are stronger than the springs which urge the sensing pins 30. When the sensing pin box 25 is raised and the sensing pins 30 sense perforations in a card, the sensing pins which penetrate perforations in the card are raised positively by the locking slides 31, and thereby raise the set pins 34. The pins 34 are then locked in their elevated position by the slides 35, until the end of the tabulating cycle at which time the locking slides 35 are positively moved by a retract bar 36 under control of a cam (not shown) fixed to the shaft 22, and thus restore the set pins to their normal lowered position.

The head section shown in connection with the present invention is substantially the same as that disclosed in the above mentioned Patent 2,151,406 and consists generally of accounting and printing mechanism. These mechanisms are under control of a stop basket 37 (Fig. 3) generally of the type disclosed in the above mentioned Patent 1,780,621, having stops 38 contained therein. When elevated, these stops are adapted by means to be later described under the heading of "flexible translator" to limit the forward movement of associated type sectors 40.

Flexible or universal translator

The tabulator to which the invention is applied having thus been described, a description will now be given of the flexible or universal translator forming the subject matter of this invention.

The stop pins 38 in the stop basket 37 are adapted to be selectively raised by the set pins 34 of the record retaining mechanism through a universal translating mechanism or translator disposed in the intermediate section of the machine.

The translator includes a plurality of incoming Bowden wires or flexible connections 50 individually adapted to be engaged by the set pins 34, a plurality of outgoing Bowden wires or flexible connections 51 individually adapted to engage the stops 38 in the stop basket 37, and a plurality of cables 52 for interconnecting the incoming wires with the outgoing wires. The incoming and outgoing Bowden wires are housed within a unitary structure which is removable from the tabulator. This structure consists of a frame 53 having secured at the lower portion thereof a terminal plate 54 (Fig. 2) having holes formed therein adapted to receive a plurality of shouldered pins 55, each of which is positioned in vertical alignment with its associated set pin 34. Directly beneath and slightly spaced apart from the terminal plate 54 is a plate 56 provided with a rectangular opening 57 through which pass the pins 55. The plate 56 is secured to the lower portion of the frame 53 by screws which pass through cross bars 58 and enter the frame 53. Suitably secured to the terminal plate 54 is a plate 60 having holes formed therein in register with the holes in the plate 54 and through which pass the shouldered portion of the pins 55 for the purpose of vertical guidance thereof. Secured to the frame is a plate 61 having tapped holes in register with the pins 55 which holes receive the threaded portion of fittings 62. These fittings are provided with internal threads to receive the lower ends of the incoming Bowden wires 50.

Secured to shoulders formed on the frame 53 is a terminal plate 63 (Fig. 3) upon which are suitably secured fittings 69 which are in register with the stops 38 of the stop basket. These fittings are provided with internal threads which are adapted to receive the upper ends of the outgoing Bowden wires 51. The fittings 62 and 69 are provided with bores through which pass flexible wires enclosed within the flexible casings of the Bowden wires 50 and 51, respectively. Secured to the top portion of frame 53 is a pair of plates 64 formed as shown in Fig. 3 to support and guide for vertical movement, a plurality of pins 65 which are urged downwardly by springs 66. The pins 65 are in register with the upper ends of the outgoing Bowden wires 51.

The plate 56 (Fig. 2) extends rearwardly and downwardly and has secured at its rear end thereof an upright terminal board 67. Suitably secured to the outer rear wall of the casing 53 and near the top thereof is a rearwardly extending bracket 68 to the rear end of which is secured the top portion of the terminal board 67. This terminal board is adapted to receive the incoming and outgoing Bowden wires as will be described later.

Figure 8:
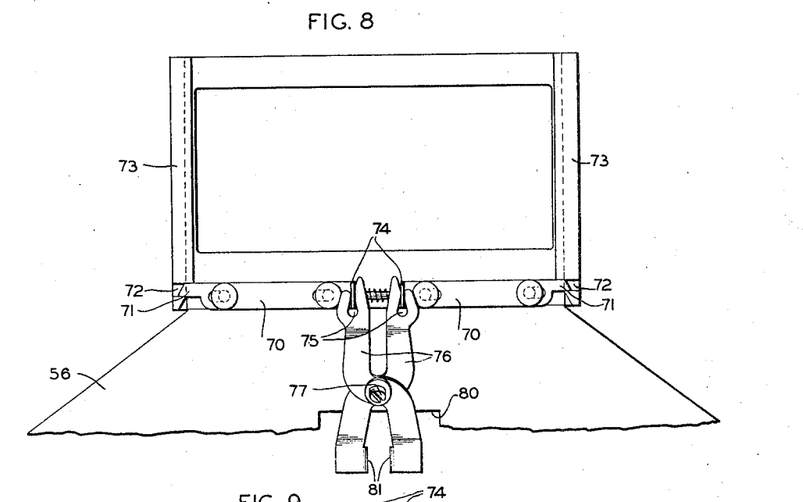
Fig. 8 is a plan view of the latch mechanism by means of which the frame, to which the terminal board is fixed, may be inserted or removed from the tabulator.
Figure 9:
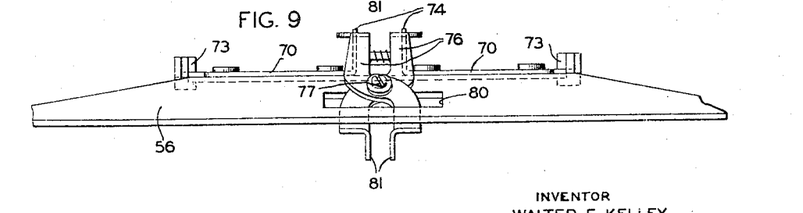
Fig. 9 is a rear view of the latch shown in Fig. 8.

As is best seen in Figs. 2, 8, and 9, the plate 56 is provided with a pair of spring-pressed locking slides 70 each having a lug 71 formed on one end thereof. The lugs are adapted to cooperate with notches 72 on a pair of guide rails 73 secured to the frames of the record retaining mechanism, which rails support and guide the plate 56. At their other end the locking slides 70 are bent upward to form arms 74 which are received in hook portions 75 formed on the forward end of a pair of pincer levers 76 which are pivotally mounted upon a stud 77 secured to the plate 56. The other ends of the pincer levers 76 extend downwardly through a slot 80, formed in the plate 56, and are bent to form downwardly extending finger pieces 81.

The above construction is such that the translator structure may be inserted or removed in the following manner: The translator is inserted in the tabulator from the rear of the machine (right of Fig. 2) by positioning the side edges of the plate 56 in a groove formed in the guide rails 73, and moving the structure toward the front of the machine (left, Fig. 2) until the lugs 71 engage the notches 72 in which position the structure is fully inserted and also locked. To remove the structure from the machine the finger pieces 81 of the pincers 76 are brought together, thereby moving the lugs 71 away from the notches 72. This permits sliding of the structure rearwardly (toward the right in Fig. 2) to remove same from the machine.

Figure 4:
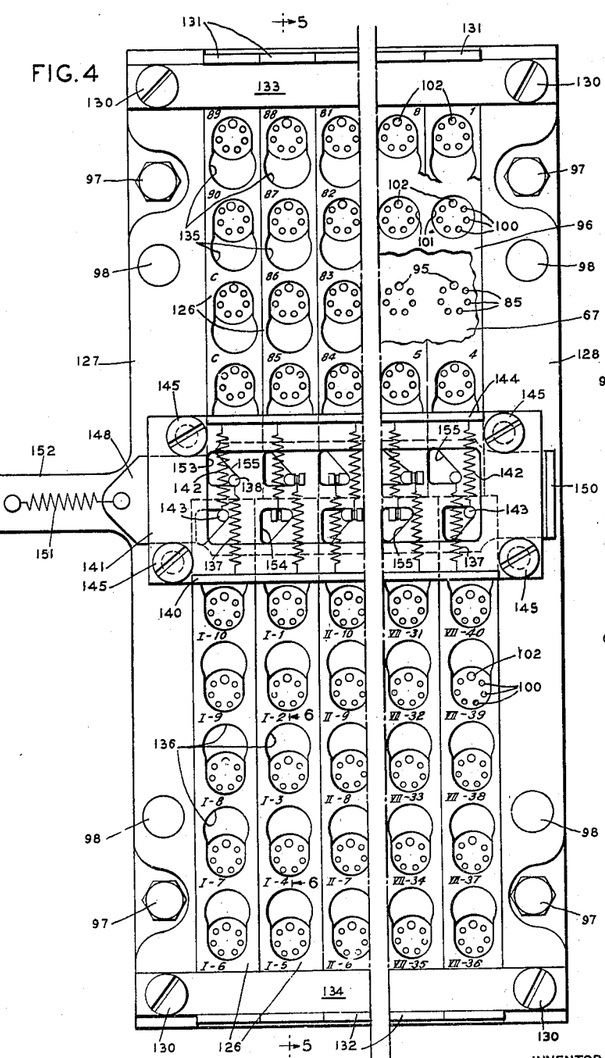
Fig. 4 is a rear elevational view of the panel board attached to the terminal board with the cables removed for the sake of clearness.
Figure 5:
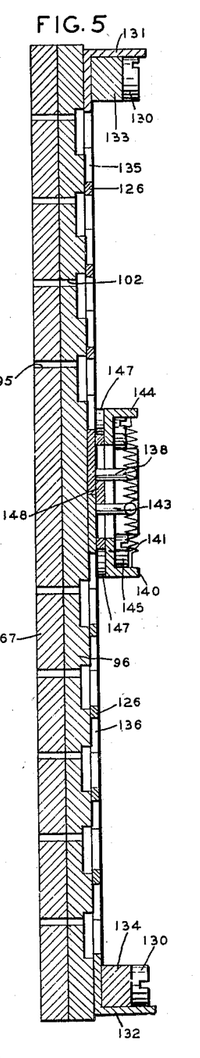
Fig. 5 is a cross sectional view taken substantially along the lines 5—5 of Fig. 4.
Figure 6:
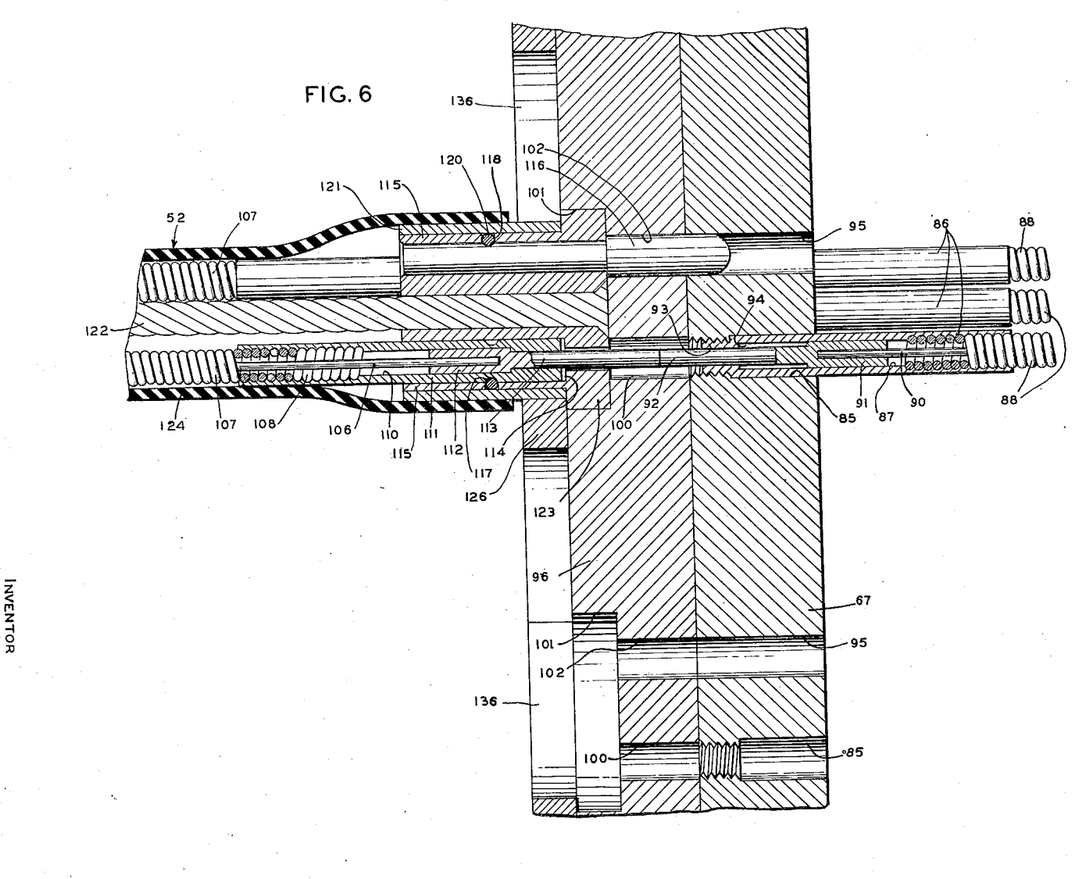
Fig. 6 is an enlarged cross sectional view taken along the line 6—6 of Fig. 4, also showing the plug of one end of a cable in the receptacle.

Referring to Figs. 4, 5, and 6, the terminal board 67 is divided into an upper and lower zone, and each zone is provided with a plurality of groups of circumferentially arranged circular openings 85, there being six of said openings in each group. As is best seen in Fig. 6, each opening is made in two different diameters, the larger having a smooth inner surface and the smaller being tapped to receive the threaded portion of a fitting 86. The shoulders formed by the larger openings serve to limit the insertion of the fittings into the board 67. Each fitting is provided with a circular bore 87, the right-hand end portion of which is tapped to receive a casing or sheath 88 of the incoming or outgoing Bowden wires 50 or 51, respectively.

Enclosed within each casing 88 is a flexible wire or interponent 90. One end of the wire 90, enclosed within the casing of the incoming Bowden wire 50, is adapted to be operated by its associated pin 34 in the record retaining mechanism and the other end of the wire 90 terminates in the fittings 86. One end of the wire 90 enclosed within the casing 88 of the outgoing Bowden wire 51 is adapted, when operated, to elevate a stop 38 in the stop basket 37 through the pin 65 and the other terminates in the fitting 86.

Within the smooth walled portion of the bore 87 is disposed, for longitudinal movement therein, a plunger 91 having an opening formed at one end into which the end of the wire core 90 extends. The plunger, at its other end, is provided with a finger 92 which passes through a smaller bore 93 within said fitting. A shoulder 94 formed by the bores 87 and 93 limits the leftward movement (Fig. 6) of the plunger 91.

For reasons which will hereinafter appear each of the groups of the circumferentially arranged circular openings 85 is provided with an additional opening 95 of larger diameter than opening 85.

It will be recalled that the terminal board 67 is divided into two zones, the upper and lower zones. The upper zone has openings which receive the fittings connected to the Bowden wires associated with the record retaining mechanism and the lower zone has openings which receive the fittings connected to the Bowden wires associated with the stop basket, the fittings in both zones being of similar construction. However, the plungers in the fittings in the upper zone are normally drawn to the right (Fig. 4), while the plungers in the fittings in the lower zones are normally drawn to the left against the action of springs 66 (Fig. 3). From the foregoing it will be seen that if the fittings in the upper and lower zones are interconnected and a perforation is sensed in a card the following will occur. A pin 55 will be raised by an associated pin 34 in the record-retaining mechanism, thus raising the associated wire core 90 in the incoming Bowden wire 50, thereby moving the plunger 91 in the upper zone to the right (Fig. 3). This motion through the interconnecting means moves the plunger 91 in the lower zone to the left, thereby raising an associated pin 65 which in turn will raise a stop 38 in the path of an associated heel of the type sector 40.

As is best seen in Figs. 4 and 5 a panel board 96 is provided which is secured to the terminal board 67 by bolts 97. Locating pins 98 on the terminal board cooperating with holes on the panel board insure the proper relative positioning of both boards. The panel board 96 is provided with a plurality of groups of circumferentially arranged circular openings or bores 100, which, when the panel board is secured to the terminal board, as above described, are in register with the openings 85 on the terminal board. Concentric with each group of openings 100 is a circular recess 101. Each group of openings 100 is provided with a large bore 102 which is in register with the opening 95 when the panel and terminal boards are secured together.

Powers tabulating machine installations may utilize either the 45 or 90 column card, which has long been in use. In the 45 column card digits are represented by a single hole code while the letters in the alphabet are represented by a multi-hole code.

Figures 13, 14, 15:
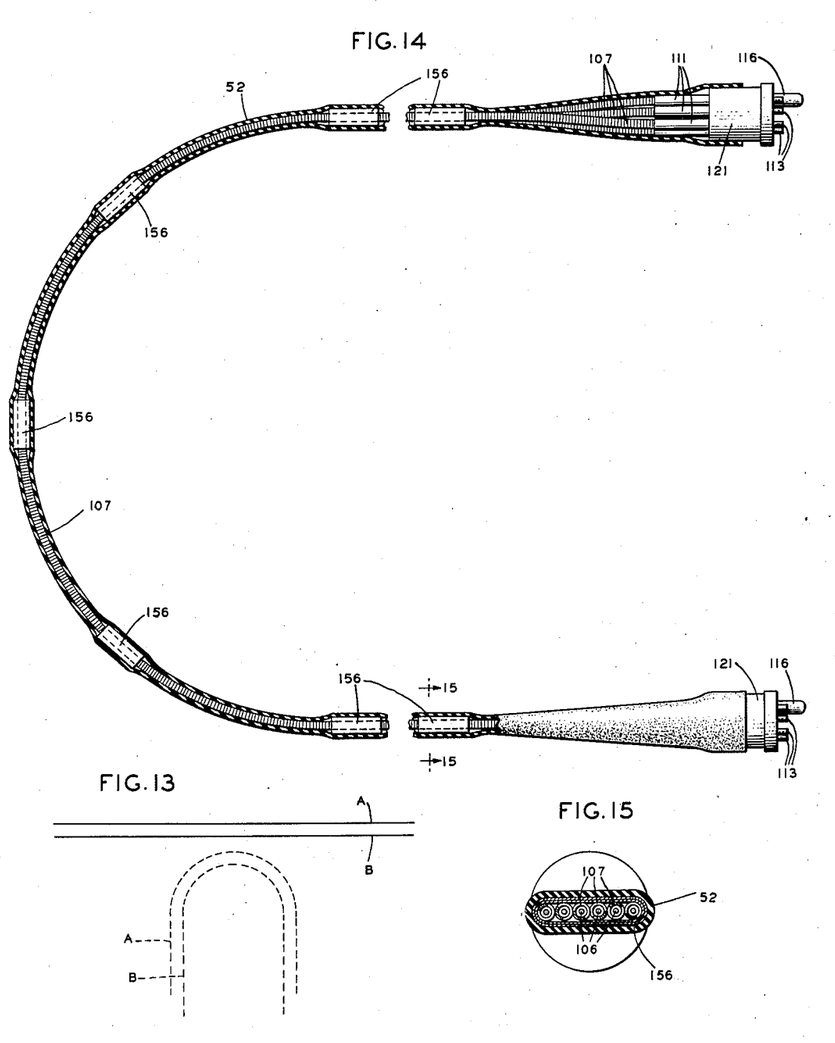
Fig. 13 is a diagrammatic view showing the relation between the ends of two parallel Bowden wires when said wires are bent.
Fig. 14 shows a modified form of cable partly in section.
Fig. 15 is an enlarged cross sectional view taken along the lines 15—15 of Fig. 14.

As is shown in Fig. 14 of U. S. Patent 2,044,119, issued to W. W. Lasker on June 16, 1936, the card contains 45 columns, each of which has 12 index positions, XII, XI, X, I, II, III, IV, V, VI, VII, VIII, and IX. In the numeric code, single perforations made in the index positions X to IX represent digits 0 to 9. In representing the letters of the alphabet, the perforations make use of a combined single and double hole code, utilizing the entire 12 index positions, the letters A to L, represented by single holes, and the letters M to Z, represented by a hole in the XII position together with a hole in any one of the other positions.

Fig. 15 of the above patent discloses a card punched in 90 column code. This card is divided into an upper and lower zone of 45 columns each, and each column consisting of six index positions, i. e., XII, XI, X, I, II, III in the upper zone, and IV, V, VI, VII, VIII, IX in the lower zone. In the 90 column card numeric representations are made by perforations using single and double hole codes, while the alphabetic letters are represented by the use of a single, double and triple hole code.

Figure 11:
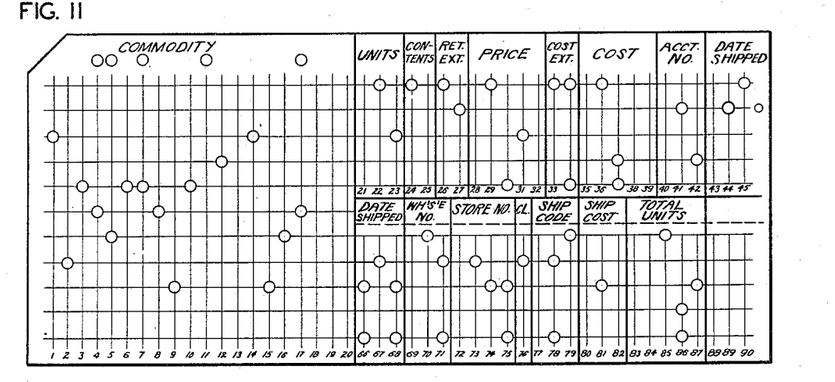
Fig. 11 illustrates a punched card from which data may be tabulated.

A type of card which may be used with the tabulator herein disclosed is shown in Fig. 11. This card makes use of the 45 column alphabet code in the first 20 columns of the card, while the remainder of the card makes use of the 90 column numeric code.

It will be recalled that there are six fittings in each group of holes in the terminal board 67 and, since twelve index positions are used for the first 20 columns in the alphabet section of the above card, it will be seen that two of said groups of fittings are required for each column. Also since the remainder of the card makes use of the 90-column numeric code, only one of said groups of fittings need be used for each column. Thus, forty groups of fittings are used for the alphabet section and fifty are used for the numeric section of the card. Two additional groups of fittings are provided for the purpose of special control holes which may be located at the right-hand edge of the card. All of the above fittings, which total 92, are in the upper zone of the terminal board 67.

It is obvious that any type of code, either single hole or multi-hole code, may be used in a machine of this character, providing that the index positions in each column are always a multiple of six.

The head portion of the tabulator, as herein disclosed, may contain six units (Fig. 12) for the accumulation and printing of digits only, and an alphabetic printing section taking the place of two numeric units. Each unit for the accumulation of digits consists of ten sectors, each sector being under control of the stops 38 in a multicode stop basket shown in Fig. 3 of the present drawings, but which is fully described in the above mentioned Patent 1,780,621. The alphabet printing section, not shown in the present drawings, but which is disclosed in the above mentioned Patent 1,780,621, includes twenty sectors which are under control of an alphabet stop basket as shown in the above mentioned patent.

Accordingly, there are eighty type sectors (20 alphabetic and 60 numeric) in the present machine, each under control of an associated group of fittings 86 there being one hundred such groups (40 alphabetic and 60 numeric). These fittings are located in the lower zone of the panel board 67.

It will be noted that the groups of fittings may be arranged in 23 columns of four in the upper zone and 20 columns of five in the lower zone.

Having thus described the incoming and outgoing Bowden wire construction and their relation to each other, a description of the means for interconnecting them will now follow.

Referring to Figs. 2, 3, 6, and 7, each of the cables 52 consists of six Bowden wires comprising a flexible wire core or interponent 106 enclosed within a casing 107, the ends of which are adapted to be threaded into tapped portions 108 formed in bores 110 of fittings 111. Within the smooth portion of the bore 110, in each fitting, is disposed a longitudinally movable plunger 112 formed with a finger 113. The ends of each wire core 106 extend into recesses formed in the plunger 112. Each of the six fittings associated with one end of a cable is adapted to be received in a circular opening, or bore 114, formed in a terminal plug 115. The arrangement of the circular openings or bores 114 is the same as that of the openings 85 and 100 formed in the terminal and panel boards respectively. The terminal plug 115 has secured thereon a locating pin 116 adapted to be received by the bores 95 and 102 in the terminal and panel boards respectively.

In order to securely hold the fittings 111 in the plugs 115 each of the fittings 111 is provided with an annular groove 117 which, when the fittings 111 are inserted in the terminal plug 115, are aligned with an annular groove 118 formed on the plug. A resilient ring 120 is provided, which, when it is positioned in the grooves 117 and 118, as shown in Fig. 6, serves to hold the fittings 111 in their proper inserted position, said rings 120 being prevented from displacement by a sleeve 121. The terminal plugs 115 are each provided with a centrally located bore in which is fixed one end of a cable or core 122 for reasons which will hereinafter appear. Each plug 115 is also provided with a flange 123 adapted to be received by the recess 101 in the panel board 96. A sheath or covering 124 is provided which is disposed about the Bowden wires above described and a portion of the sleeves 121.

Figure 10:
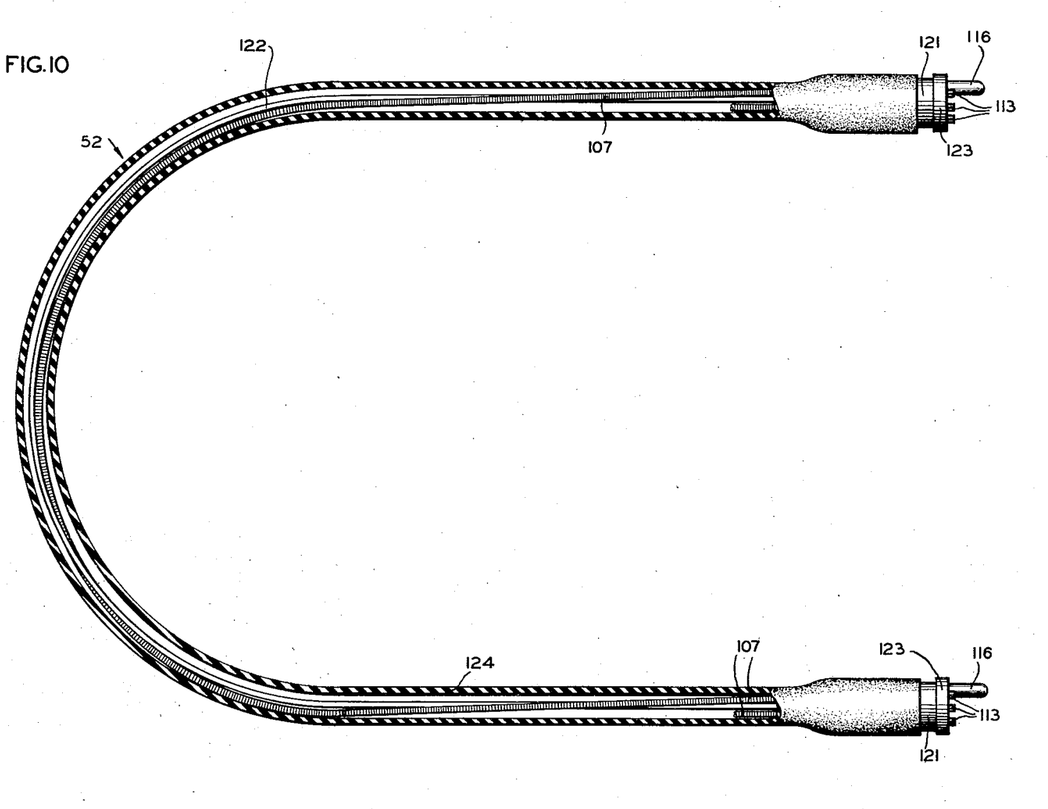
Fig. 10 is a view of one of the cables partly in section showing the arrangement of one flexible interponent enclosed therein.

For purposes which will hereinafter appear the Bowden wires which comprise the cable are laid an odd number of half turns about the central cable 122 and accordingly the fitting 123 associated with one end of a flexible interponent 106 is secured to one terminal plug 180° away from the point at which the fitting associated with the opposite end of the flexible interponent is secured to the other terminal plug (Fig. 10).

As is diagrammatically shown in Fig. 13, if two flexible interponents A and B (in full lines), having equal lengths, are bent to form a U-shape (in dotted lines) the ends of B extend beyond the ends of A, the distance which B extends from A being determined by the arc formed therewith. If this arrangement is used in the machine herein disclosed, it will be seen that, when the incoming and outgoing Bowden wires 50 and 51 are connected by the cable 52, the ends of the wire cores 90 will be moved varying distances, according to the arc formed by the cable. Obviously, this may cause some of the stops 38 to rise prematurely while others may not rise sufficiently, when raised by a pin 34, to move into the path of its associated sector 40. It is well known that the above holds true if the flexible interponents are laid an even number of times about the central cable 122.

Therefore, in order to prevent the interponents 106 from being displaced varying distances when the plugs are inserted in their proper receptacles, it is necessary to lay each Bowden wire casing 107 an odd number of half turns about the central cable 122. In the present instance the casings 107 are laid about the cable 122 one and one-half turns as shown in Fig. 10.

Figure 7:
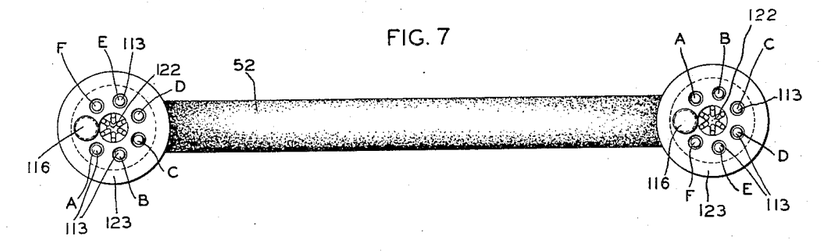
Fig. 7 is a view showing the two cable extremities.

As mentioned above the fitting 123 associated with one end of a flexible interponent is secured to one terminal plug 180° away from the point at which the fitting associated with the opposite end of the flexible interponent is secured to the other terminal plug. Referring to Fig. 7 the ends of the fingers 113 associated with one end of the flexible interponents are designated as A, B, C, D, E, and F in a counter-clockwise direction beyond the pin 116, while the ends of the fingers 113 associated with the other end of the flexible interponents are designated as A, B, C, D, E, and F in a clockwise direction beyond the pin 116. From the foregoing it will be seen that any one of the terminal plugs may be inserted in either the upper or lower zone receptacle without affecting the connection between the incoming or outgoing flexible connection 50 or 51 respectively. The terminal plugs are inserted in their respective receptacles by inserting the pins 116 in openings 102.

The following is a description of the mechanism for locking the terminals plugs in their respective receptalces.

As has been described above there are twenty-three columns of circumferentially arranged groups of openings 100 in the upper zone of the panel board 96, each column consisting of four groups of said openings, and twenty columns of circumferentially arranged groups of openings 100 in the lower zone of the panel board 96, each column consisting of five groups of said openings. As is best seen in Figs. 4 and 6, each column of groups of openings in the upper and lower zones has aligned therewith a vertically movable latching slide 126. These slides are disposed adjacent to each other and are prevented from lateral displacement by a pair of upright plates 127 and 128 secured to the panel board 96 by screws 130. The plates are provided with holes which receive the locating pins 98 secured to the terminal board 67. The slides associated with the columns of groups of openings in the upper zone are each bent at their upper end to form finger pieces 131 and the slides associated with the groups of openings in the lower zone are bent at their lower end to form finger pieces 132. A pair of cross bars 133 and 134 secured to the panel board 96 by the screws 130 serve to guide the vertical movement of the slides in the upper and lower zones respectively.

Each latching slide 126 in the upper zone is provided with four openings 135 and each latching slide 126 in the lower zone is provided with five openings 136. The openings 135 have reduced upper portions and enlarged lower portions while the openings 136 have enlarged upper portions and reduced lower portions. As is best seen in Fig. 4 the slides when in normal latching position have their reduced portions in alignment with the recesses 101. Each slide in the upper zone is urged downwardly by a spring 137, one end of which is connected to a pin 138 fixed to the slide and the other end connected to a bent over portion 140 formed on a cross plate 141. Each slide in the lower zone is urged upwardly by a spring 142 having one end thereof connected to a pin 143 fixed on the slide 126 and the other end connected to a bent-over portion 144 formed on the cross plate 141, which plate is secured to the panel board by screws 145. This cross plate is provided with a rectangular opening, through which pass the pins 138 and 143 and is spaced away from the slides 126 and the plates 127 and 128 by means of spacers 147 (Fig. 5) through which pass the shanks of the screws 145. The spacers are adapted to support and guide a movable locking slide 148, the right hand portion (Fig. 4) of which is bent to form a finger piece 150 and the left hand portion of which is connected to a spring 151. The other end of spring 151 is connected to a pin fixed to an arm 152 formed integral with the upright plate 127, and serves to urge the slide 148 to the left (Fig. 4).

The locking slide 148 is provided with an upper row of slots 153, one for each slide 126 in the upper zone and a lower row of slots 154, one for each slide 126 in the lower zone. The slots 153 and 154 are provided with cam portions 155 which are adapted to cooperate with the pins 138 and 143 in such a manner that when the locking slide 148 is in its leftward position the cam portions act to hold the slides 126 in a position wherein the reduced portions of the openings of the slides are in register with the openings 85 and 100. When the slide 148 is moved to the right, the cam portions 155 of the slots 153 and 154 are moved out of the path of the pins 138 and 153, thus permitting the vertical movement of the slides 126 against the tension of their respective springs.

The above construction is such that when a terminal plug is to be inserted in the plug receptables of the upper zone the locking plate 148 is first moved to the right (Fig. 4). The slide 126 associated with the column in which is located the proper receptacle, is then raised so that the enlarged portion of the slot 135 is in register with said receptacle. The pin 116 in the terminal plug is then inserted into the bore 102 in the panel board and the slide 126 is permitted to drop to normal position through its spring 137. When the slide is thus lowered, the reduced portions of the slots 135, being of smaller diameter than the annular flange 123 of the terminal plug 115, will hold the plug in its inserted position. The terminal plug 115 in the opposite end is inserted in the lower zone in the same manner as above except that the slide 126, associated with the column in which is located the proper receptacle, is first lowered to move the enlarged portion of the opening 136 in register with the plug receptacle and then when the terminal plug is properly inserted the slide is permitted to rise to its latching position. Having inserted and latched the terminal plugs as above described, the locking slide 148 is then released, thereby locking the latching slides.

Referring to Figs. 14 and 15, a modified form of the cable 52 is shown in which the fittings 111 of the Bowden wires are arranged in the terminal plug 121 in the same manner as described above. At a suitable distance away from the plug 121 the Bowden wires are held together by a plurality of clips or fasteners 156 and when so fastened the Bowden wires are formed in a parallel relation to one plane. The above construction is such that the terminal plugs of the cable may be inserted in the plug receptacles in the same manner as was previously described without affecting the connection between the incoming and outgoing wires.

It will be noted at this time that the arrangement of the incoming Bowden wires 50 in the upper zone of the terminal plate 67 (Fig. 4) is as follows: Beginning from the top right-hand side and moving down, the groups are numbered 1, 2, 3, and 4 and then the next column moving up, the groups are numbered 5, 6, 7, and 8 and so forth, until the last column to the left, which has two groups 89 and 90 plus 2 groups lettered C which are used for controls. The Bowden wires 51 associated with the stops 38 in the stop basket terminate in the lower zone of the terminal board as follows: Beginning with the right-hand column and moving toward the left the groups are designated as VII—40 to VII—1, inclusive, these groups being used to control the alphabet sectors only (VII—40 to VII—31 being in Fig. 4). The remaining groups are designated as VI—1 to VI—10, V—1 to V—10, IV—1 to IV—10, III—1 to III—10, II—1 to II—10, I—1 to I—10, these groups being used for controlling the numeric sectors (only three columns of such groups being shown in Fig. 4). It will be seen from the above that the upper zone contains 92 groups and the lower zone contains 100 groups of openings. (The roman numerals designate the unit and the Arabic numerals designate the sector.)

Figure 12:
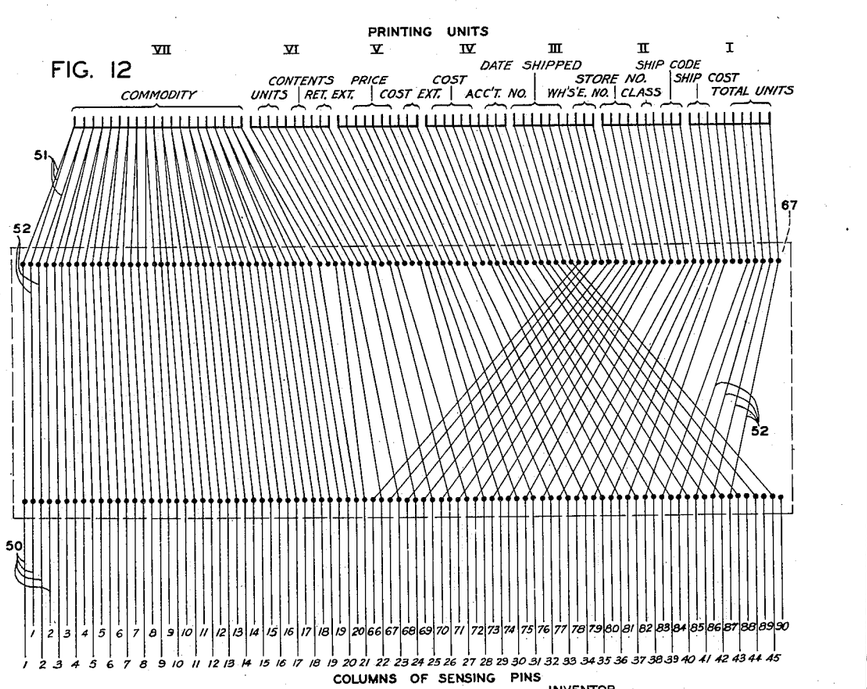
Fig. 12 is a schematic view illustrating the way in which the universal translator cables interconnect the incoming and outgoing flexible connections when a card such as that shown in Fig. 11 is to be analyzed.

In summation, let it be assumed that the type of card to be sensed and tabulated is like that shown in Fig. 11 and it is desirous to record the data punched in the card in the arrangement as shown at the top of Fig. 12. This figure shows in schematic form seven sector units I to VII with which are operatively associated with the Bowden wire interponents 51, which terminate in the lower zone of the terminal plate 67, the lower zone shown above the upper zone in this figure for the sake of clearness. The lower portion of this figure shows a plurality of sensing pins 1 to 90 and their associated Bowden wire interponents 50 which terminate in the upper zone of the board 67. The center portion of Fig. 12 shows the necessary connection made by use of the cables 52 to effect the desired arrangement.

While there are above described but a limited number of embodiments of the invention, it is possible to produce still other embodiments without departure from the inventive concept above disclosed, and it is, therefore, desired that only such limitations shall be imposed on the appended claims as are stated therein, or required by the prior art.

What I claim as new, and desire to secure by Letters Patent, is:

1. In an interconnection system, the combination of a terminal board in which a plurality of sets of actuating and a plurality of sets of actuable flexible connections terminate, and a cable adapted to be interposed between the terminal ends of any one set of actuating and any one set of actuable flexible connections, said cable including a plurality of flexible interponents to interconnect the flexible connections of the two sets between which the cable is interposed.

2. In an interconnection system, the combination of a terminal board divided into two zones individually provided with a plurality of connection positions, a set of actuable flexible connections terminating in each connection position of one zone and a set of actuating flexible connections terminating in each connection position of the other zone, a panel associated with the terminal board and also divided into two zones each having a plurality of plug receptacles individual to the connection positions in the corresponding zone of the board, and a cable provided with a pair of terminal plugs adapted to be inserted in a plug receptable in each zone, said cable including a plurality of flexible interponents adapted to interconnect the sets of flexible connections terminating in the two connection positions corresponding to the plug receptacles in which the cable plugs are inserted.

3. In an interconnection system, the combination of a terminal board in which a plurality of sets of actuating and a plurality of sets of actuable flexible connections terminate, a cable adapted to be interposed between the terminal ends of any one set of actuating with any one set of actuable flexible connections, said cable including a plurality of flexible interponents adapted to interconnect the flexible connections of any two sets between which the cable is interposed, and means for insuring that the flexible interponents in said cable are properly aligned with the corresponding flexible connections of the two sets between which the cable is interposed.

4. In an interconnection system, a plurality of actuating and a plurality of actuable members, a plurality of incoming flexible connections individually engaging the actuating members, a plurality of outgoing flexible connections individually engaging the actuable members, said connections being divided into sets, a terminal board in which each set of connections terminates, and a cable adapted to be interposed between the terminal ends of any one set of incoming flexible connections and the terminal ends of any one set of outgoing flexible connections to interconnect the flexible connections of one set with the corresponding flexible connections of the other set.

5. In an interconnection system, a plurality of actuating and a plurality of actuable members, a plurality of incoming flexible connections individually engaging the actuating members, a plurality of outgoing flexible connections individually engaging the actuable members, said connections being divided into sets, a terminal board divided into two zones, a plurality of connection positions in one zone in which the sets of incoming connections individually terminate, a plurality of connection position in the other zone in which the sets of outgoing connections individually terminate, and a cable adapted to be interposed between the terminal ends of any one set of incoming flexible connections and the terminal ends of any one set of out-going flexible connections to interconnect the flexible connections of one set with the corresponding flexible connections of the other set.

6. In an interconnection system, the combination of a terminal board provided with a plurality of connection positions, each having a set of flexible connections terminating therein, a panel associated with the terminal board and provided with a plurality of plug receptacles individual to the connection positions, a plurality of movable plates associated with the panel and provided with openings normally offset from the plug receptacles but adapted to be aligned therewith when the plates are offset from their normal position, and a cable provided with a pair of terminal plugs adapted to be inserted in any two plug receptacles through the plate openings aligned therewith, said cable including a plurality of flexible interponents to interconnect the sets of flexible connections terminating in the two connection positions corresponding to the plug receptacles in which the cable plugs are inserted.

7. A cable provided with a pair of terminal plugs, and a plurality of Bowden wires having their opposite ends terminating in said plugs, the ends of the Bowden wires terminating in one plug being offset substantially 180° from their ends terminating in the other plug to prevent said wires from being displaced varying distances from said plugs when said cable is bowed.

8. A cable including a central core having a terminal plug on each end thereof, and a plurality of Bowden wires having their opposite ends terminating in said plugs, said Bowden wires being laid an odd number of half turns about said central core between the ends terminating in one plug and those terminating in the other plug to prevent said wires from being displaced varying distances from said plugs when said cable is bowed.

9. A cable provided with a pair of terminal plugs, a plurality of Bowden wires having their opposite ends terminating in said plugs, the ends of the Bowden wires in one plug being offset substantially 180° from their ends terminating in the other plug to prevent said wires from being displaced varying distances from said plugs when said cable is bowed, and means for maintaining the central portion of the Bowden wires in flat strip-like relation.

10. In an interconnection system, the combination of a terminal board divided into two zones, a plurality of connection positions in each zone in each of which a set of Bowden wires terminates, a cable adapted to be interposed between a position in one zone and a position in the other zone, said cable including a plurality of Bowden wires adapted to interconnect the sets of Bowden wires terminating in the two connection positions between which the cable is interposed.

11. In an interconnection system, the combination of a terminal board provided with a plurality of connection positions in which sets of Bowden wires individually terminate, a panel associated with the terminal board and provided with a plurality of plug receptacles individual to the connection positions, a cable provided with a pair of terminal plugs adapted to be inserted in said plug receptacles, said cable including a plurality of Bowden wires adapted to interconnect the sets of connections terminating in the two connection positions corresponding to the plug receptacles in which the cable plugs are inserted.

12. A cable of the class described comprising in combination a plurality of flexible push wires individually enclosed in casings, a fitting provided with annular grooves for each end of said casings, a plunger housed within said fitting and operable by its associated push wire, a pair of terminal plugs provided with openings to receive said fittings and through which a portion of said plungers are adapted to protrude, said plugs being formed with a pair of outer peripheries, a resilient ring for each plug cooperating with said annular grooves when said fittings are in their inserted position, a sleeve to enclose the smaller of said peripheries for retaining said resilient ring in its effective position, a core having its extremities secured to said plugs about which the casings of said interponents are laid an odd number of half turns, and a sheath for enclosing said casing, core, and a portion of said plugs.

13. In an interconnection system, the combination of a first terminal plate, a second terminal plate, a terminal board, divided into two zones of sets of connection positions, a plurality of actuable flexible connections terminating at one end in said first terminal plate and at the other end in the sets of connection positions in one zone, a plurality of actuating flexible connections terminating at one end in said second terminal plate, and at the other end in the sets of connection positions in the other zone, and a cable adapted to be interposed between any one set of connection positions in one zone and any one set of connection positions in the other zone, said cable comprising a plurality of flexible interponents for connecting a set of actuable flexible connections in one zone with the corresponding actuating flexible connections in the other zone between which the cable is interposed.

14. In an interconnection system, the combination of a panel divided into two zones each having a plurality of plug receptacles, two sets of plates individual to the zones, the plates of each set having openings adapted to be alternately aligned with the plug receptacles and offset therefrom, a cable having terminal plugs adapted to be inserted in the plug receptacle through the plate openings aligned therewith, and to be locked in the receptacles when the openings are offset therefrom, and means common to said sets of plates for retaining said sets of plates in locking position.

15. In an interconnection system, the combination of a terminal board divided into two zones, a plurality of sets of connection positions in one zone in each of which one end of a plurality of sets of actuable incoming connections terminate, a plurality of sets of connection positions in the other zone in each of which one end of a plurality of sets of actuating outgoing connections terminate, a panel board having plug receptacles in register with said sets of connection positions, a cable having terminal plugs for said receptacles, one being adapted to be received in any one plug receptacle in one zone and the other being adapted to be received in any one plug receptacle in the other zone, said cable including a plurality of flexible interponents for connecting the corresponding actuable incoming connections with the corresponding actuating outgoing connections between which the cable is interposed.

16. In an interconnection system, a terminal board, a plurality of Bowden wires terminating in groups of equal number in said terminal board, a second plurality of Bowden wires terminating in said terminal board in groups of the same number as said first mentioned groups, and a cable comprising a similar number of Bowden wires as said group and adapted to be interposed between any one group of said first mentioned Bowden wires with any one group of said second mentioned Bowden wires to transmit motion from the Bowden wires of one group to corresponding Bowden wires of the other group.

17. In an interconnection system the combination of a terminal board in which a plurality of sets of actuable and a plurality of sets of actuating flexible connections terminate, and a cable adapted to be interposed between the terminal ends of any one set of actuable connections with any one set of actuating connections, said cable comprising a plurality of flexible interponents for transmitting axial movement from said set of actuable connections to said set of actuating connections.

WALTER F. KELLEY.